(12) United States Patent
Flammer

(10) Patent No.: US 7,903,797 B1
(45) Date of Patent: *Mar. 8, 2011

(54) METHODS AND SYSTEMS FOR CREATING AND DELIVERING GROUP RECORDINGS

(75) Inventor: Hope Flammer, Atlanta, GA (US)

(73) Assignee: Hopechest Voices, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/611,628

(22) Filed: Nov. 3, 2009

Related U.S. Application Data

(63) Continuation of application No. 11/153,576, filed on Jun. 14, 2005, now Pat. No. 7,634,068.

(60) Provisional application No. 60/580,312, filed on Jun. 16, 2004.

(51) Int. Cl.
*H04M 1/64* (2006.01)

(52) U.S. Cl. .................. 379/88.23; 379/88.26; 704/201; 704/272

(58) Field of Classification Search .................. 379/80, 379/88.23, 88.26; 704/201, 272
See application file for complete search history.

(56) References Cited

U.S. PATENT DOCUMENTS

| | | | |
|---|---|---|---|
| 2,976,049 A | 3/1961 | Ronci | |
| 4,827,512 A | 5/1989 | Hirokawa et al. | |
| 5,063,698 A | 11/1991 | Johnson et al. | |
| 5,166,851 A | 11/1992 | Jacobson | |
| 5,251,251 A | 10/1993 | Barber et al. | |
| 5,279,514 A | 1/1994 | Lacombe et al. | |
| 5,425,078 A | 6/1995 | Stern | |
| 5,444,767 A | 8/1995 | Goetcheus et al. | |
| 5,568,540 A | 10/1996 | Greco et al. | |
| 5,570,414 A | 10/1996 | Stern | |
| 5,708,698 A | 1/1998 | Akahane | |
| 5,787,151 A | 7/1998 | Nakatsu et al. | |
| 5,828,732 A | 10/1998 | Gow | |
| 6,011,833 A | 1/2000 | West | |
| 6,356,626 B1 | 3/2002 | Ohara et al. | |
| 6,804,806 B1 | 10/2004 | Bansal et al. | |
| 2002/0037072 A1 | 3/2002 | Rankin | |
| 2003/0063716 A1 | 4/2003 | Turner et al. | |
| 2005/0283741 A1 | 12/2005 | Balabanovic et al. | |

OTHER PUBLICATIONS

Chalfen, R., *Snapshot Versions of Life* Bowling Gren State University Popular Press, pp. 34-41 and pp. 70-71, Bowling Green, OH (1987).

(Continued)

*Primary Examiner* — Creighton Smith
(74) *Attorney, Agent, or Firm* — Ropes & Gray LLP

(57) ABSTRACT

Methods, systems and devices for creating special communications or recordings containing messages from family members and the like may be delivered to a recipient in the form of a keepsake type of device that can be used to play the communications when and as many times as desired. The inventions enable a subscriber to provide message(s) to a recipient, including receiving a project subscription, assignment of a mailbox with access number, provision of invitation identification numbers for subscriber's distribution to participants, recording of greeting to be played to communication(s) directed to the mailbox, receiving communication(s), storage of message(s) received as part of the communication(s) in association with the project's mailbox, optimizing the message(s) for subscriber access, notifying subscriber of receipt of or information about message(s), including message(s) on medium(s) or device(s) selected by subscriber that allow playback or transmitting the medium(s) or device(s) with message(s) per subscriber's directions.

11 Claims, 9 Drawing Sheets

OTHER PUBLICATIONS

Csikszenihalyi, M. and Rochberg-Halton, E., *The Meaning of Things: Domestic Symbols and the Self*, Cambridge University Press, pp. 56-58 and pp. 66-69, Cambridge, UK (1981).

Frohlich et al., *Augmenting Photographs with Audio*, HPL-2000-105, HP Laboratories, pp. 1-5, Bristol, UK (2000).

Frohlich et al., *The Memory Box*, HPL-2000-95, HP Laboratories, pp. 1-4, Bristol, UK (2000).

Frohlich et al., *Audiophotography: Practice and prospects*, CHI '99 extended abstracts, ACM Press, pp. 296-297, New York, NY (1999).

Ishii et al. *Tangible Bits: Towards Seanmless Interfaces between People, Bits and Atoms*, CHI '97 proceedings, ACM Press, pp. 1-8, New York, NY (1997).

Want et al., *Bridging Physical and Virtual Worlds with Electronic Tags*, CHI '99 proceedings, ACM Press, pp. 1-8, New York, NY (1999).

| | DATE | TELEPHONE NUMBER OF RECORDING | CATEGORY | VOICEMAIL MESSAGE | LABEL OF INVITEE | LENGTH OF MESSAGE | PLAYLIST ORDER |
|---|---|---|---|---|---|---|---|
| PLAY | 09-Feb-04 | 8132515422 | Family ▽ | WilsonBdayMessage 7 | Aunt Donna | 1:23 | 1 |
| PLAY | 05-Feb-04 | 8288833345 | Family ▽ | WilsonBdayMessage 6 | Uncle Greg | 4:56 | 2 |
| PLAY | 03-Feb-04 | 8133639609 | Family ▽ | WilsonBdayMessage 5 | Aunt Nini | 7:08 | 3 |
| PLAY | 01-Feb-04 | Caller ID Blocked | Church ▽ | WilsonBdayMessage 4 | Courtney | 1:29 | 4 |
| PLAY | 01-Feb-04 | 2623699913 | Family ▽ | WilsonBdayMessage 3 | Aunt Diane | 3:45 | 5 |
| PLAY | 28-Jan-03 | 8138356050 | Friend ▽ | WilsonBdayMessage 2 | Matthew | 6:07 | 6 |
| PLAY | 22-Jan-03 | 8138356050 | Coworker ▽ | WilsonBdayMessage 1 | Ms. O'Keefe | 8:19 | 7 |

| CATEGORY |
|---|
| Family |
| Friend |
| Coworker |
| Church |
| Neighbor |

FIG. 9

METHODS AND SYSTEMS FOR CREATING AND DELIVERING GROUP RECORDINGS

RELATED APPLICATION

This application is a continuation of U.S. patent application Ser. No. 11/153,576, filed Jun. 14, 2005, which claims priority from U.S. Provisional Patent Application Ser. No. 60/580,312, entitled "Methods and Systems for Creating and Delivering Group Audio Recordings," filed Jun. 16, 2004. The contents of each of these applications are hereby incorporated herein by reference.

FIELD OF THE INVENTIONS

The disclosed inventions relate to methods, systems and devices for creating special audio, video, and/or audiovisual communications or recordings that may be delivered to a recipient in the form of a keepsake type of playback device, or other types of playback devices.

BACKGROUND OF THE INVENTIONS

There are occasions in life, such as anniversaries, weddings, retirements, promotions, graduations, award presentations, confirmations, birthdays, holidays, funerals, illness, hospitalizations and the like where it would be desirable to provide the person or persons involved in the occasion (referred to here as the "recipient") with a special communication or recording or a group of special communications or recordings from family members, friends, coworkers, colleagues and the like, that is in the form of a keepsake type of playback device or another type of playback device where the communications or recordings could be played at the recipient's convenience and could be played as many times as desired, and could be played even after current recording standards and operating systems change.

There are many existing methods of communicating with such recipients, including (1) providing written messages, letters, notes, greeting cards, photographs, gifts, mementos and the like, all of which may not convey as much as a spoken message; (2) face-to-face oral presentations, which require a physical presence and are typically not repeatable or preserved in recorded form; (3) telephone or videophone type communications, which have the same drawbacks as face-to-face presentations, and have other drawbacks such as timing considerations including being made at a time that may be intrusive or inconvenient for the recipient, and requiring special equipment in the case of videophones; (4) audio, video or audio-visual presentations recorded by a tape recorder, movie camera, video camera or other conventional recording device, which may require considerable time, effort and skill to prepare and assemble, especially when geographically dispersed family members are involved, and would also require special equipment to present, including an appropriate playback device that may not be readily available.

All of the above methods are commonly used, and each have their advantages and disadvantages. However, they are particularly unsuitable when it is desired to create and present a special communication or recorded message or a group of special communications or recorded messages to a recipient where it is desired to present the communications or messages in a form that stores the communications or messages on a suitable recording medium that is incorporated in a keepsake type of playback device or other types of playback devices that allow for playback of the communications at the recipient's convenience and as many times as desired, and would allow for playback even after current recording standards and operating systems change. This is especially true when those persons who participate in making the communications or recordings are geographically dispersed, or are otherwise unable to get together in one location to prepare a face-to-face presentation or a recorded audio or video presentation.

For example, if a family member or friend is hospitalized as a patient for treatment of a serious condition, and other family members or friends are dispersed geographically in various locations around the country, it may be difficult for some or all family members or friends to visit the patient or discern when it is an appropriate time to telephone or otherwise contact the patient to offer encouragement and support. These difficulties may result in a lack of effective communication by the family members or friends with the patient. It may also be difficult and time-consuming for a single person or a group of persons to prepare a collected group of recorded communications or messages for the patient. In such a situation, it may be desirable to assemble a group of encouraging and supportive communications or messages from various family members and/or friends in a form that could be delivered or given to the patient so that the patient could listen to or view the communications or recordings at a convenient time rather than be subjected to intrusive telephone calls, visits at inconvenient times, and other less effective efforts to communicate wishes of encouragement and support.

Other situations where it may be difficult and time-consuming to assemble a recorded presentation of encouraging, congratulatory or other supportive communications or messages by conventional means include any of the occasions mentioned above or other special occasions. The drawbacks with conventional means of preparing such communications are compounded where the participants that desire to participate in the presentation are geographically dispersed, or are otherwise unable to get together in one location to prepare a conventionally recorded presentation or participate in a live presentation, for example, because of difficult relationships between family members. Even if all or some of the participants can attend the special occasion, it still may be desired to prepare a special presentation recorded in a keepsake type of playback device or in other types of playback devices both as described below, so that the recipients can cherish the memory of the special occasion, even after current recording standards and operating systems change.

SUMMARY

Thus, the inventions disclosed herein relate to methods, systems and devices for creating such special communications or recordings containing messages from family members, friends, coworkers, colleagues and the like, that may be delivered to a recipient in the form of a keepsake type of playback device or another type of playback device that can be used to play the communications or recordings when and as many times as desired.

Stated generally, the disclosed inventions enable a person referred to here as a "leader" or a "subscriber" to organize other "participants" or "invitees", to assist in the preparation of communications or messages to and to provide to a recipient or to multiple recipients a device that includes a "presentation," which comprises the actual recorded communications or messages from one or more participants, referred to here as a "playlist of messages." More particularly, the inventions allow the leader, who may be self-appointed or designated by other participants, to solicit communications or messages from other participants, to provide the other participants instructions, information, and suggestions for the recording and content of communications or messages, to edit the communications or messages into a playlist of messages, to select a medium or device and a means for delivery of the playlist of messages to a recipient, and to cause the playlist of messages to be delivered to a recipient in the form of a keepsake type of playback device or another type of playback device.

Advantageously, the inventions allow a leader to present the playlist of messages in a manner and on a medium or device that is convenient and accessible to a recipient as well as the leader. A recipient may easily play and replay some or all of the playlist of messages as many times as desired.

The inventions provide a leader with an easy, convenient, cost-effective, quick, and fun method of putting together and editing communications or messages from other participants and presenting them to a recipient who may replay them as many times as desired. The inventions make the process easy for the leader by assuming many of the administrative, organizational, and technical functions with respect to the creation, formatting, editing and delivery of the playlist of messages. For example, the inventions assume the functions with respect to inviting other participants, and persuading reluctant participants to participate.

The inventions may also provide the leader with tips, tools and resources for various aspects of the project of creating the playlist of messages (referred to here as the "message project"). For example, templates and suggestions may be provided for use in the solicitation of messages, invitations to participation, persuasion of reluctant participants, follow-up on solicitations, and information about content, length, or style of messages. As another example, the leader may be provided with assistance and aid in the organization and editing of the messages for the playlist of messages.

Another advantage of the inventions is that they may be implemented and carried out with familiar, popular, convenient, easy-to-use and accessible devices. Some embodiments at least partially implement the inventions through use of communication devices such as telephones and computers. Options may be provided that allow a leader to subscribe to a message project or to contact a customer service representative of a service that offers subscriptions to message projects (referred to here as "a message presentation service"). For example, an on-screen button may be provided on a website of a message presentation service that the leader may select to send an e-mail to the website or a customer service representative, or to contact a customer service representative in real time using a voice connection over the Internet or the like, or to fill out a form on a website.

The leader may solicit other persons to participate in the message project by using e-mail or other invitations, such as telephone messages, text messages, instant messages or in person. A participant may call in a message using a toll-free telephone number to a call processing system. The call processing system may alert the message presentation service upon the receipt of the message, which in turn may alert the leader, and provide information about the message left by the participant. The call processing system may interact with a computer system to optimize the messages into an appropriate format for use in the message project. For example, the message left by the participant using the call processing system may be converted to a digital message and transferred to a website or other storage device such as a storage medium associated with the message presentation service.

The leader may use a computer or other communication device to edit and organize the messages into an interim or final playlist of messages. The leader may further use a computer or other communication device to direct the service to include the final playlist of messages on a particular medium or device, and to select a manner of transmitting the medium or device to a recipient. Finally, the leader may use a computer or other communication device to direct the service to send the final playlist of messages on the selected medium or device to a recipient via the selected manner of delivery.

One embodiment of the inventions may include a method of enabling a leader to present a playlist of messages to a recipient. The method may include receiving a subscription to begin a message project from a leader, assigning a mailbox with an access number to the leader's project in a storage device that will serve as the repository of the messages, and providing the leader with project information including the access number for the leader's use. The project information also may include templates, tips, suggestions, thought-starters or other information for use by the leader and the other participants. The leader may deliver his or her own invitations to the other paticipants or invitees in person or may provide contact information for delivery of the invitations by an alternative method, such as by regular mail, e-mail or telephone calls or messages.

One embodiment allows participants to call a toll-free telephone number to enable them to leave their messages. In an initial response to such a communication, a greeting from the leader may be played and further information may be provided about leaving a message for inclusion in the message project. Other embodiments allow participants to record a message on a recording system that is accessible over the Internet, or at a retail outlet or other location, and to deliver the message to the leader by e-mail or other means. The various messages from participants may be stored in association with the project's mailbox. An option allows for the leader to designate categories of participants, and to designate different lengths of messages for the project depending upon the category of participant.

The method also may include optimizing the messages for the leader's access, and notifying the leader about the receipt of messages or information about messages. The notification may provide the leader with quick access to allow the leader to listen to messages. In addition, the method may provide the leader with information on editing, and allow the leader access to edit messages. The editing process may allow the leader to create one or more playlists of messages for the message project.

A playlist of messages may be included on one or more mediums or devices as selected by the leader. One option allows for a playlist of messages to be included on a medium or in a device that may function and be treasured by the recipient as a keepsake, referred to here as a "keepsake type of playlist device." Generally, the mediums or devices used will allow for the playing and replaying of playlists of messages as many times as desired, even after current recording standards and operating systems may have changed. Finally, the mediums or devices may be delivered to a recipient based on instructions received from the leader.

The features and advantages of the inventions will be apparent upon a review of the following detailed description of embodiments and by reference to the appended drawings and claims.

BRIEF DESCRIPTION OF THE DRAWINGS

FIG. 9 is an example of a table that may be used with an embodiment of the method.

DETAILED DESCRIPTION

Figure 1:
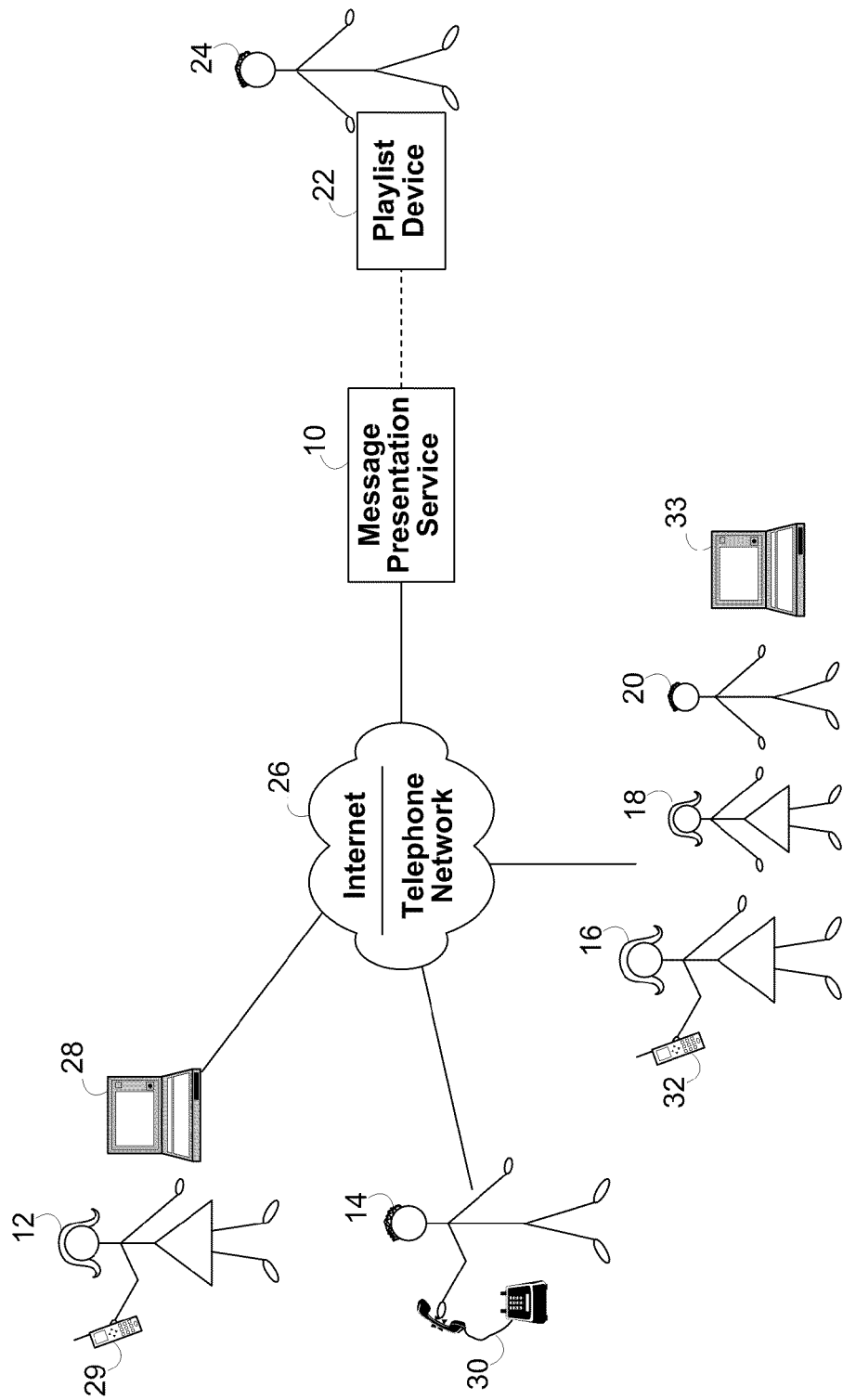
FIG. 1 illustrates an environment within which an embodiment of the disclosed method may be used.

FIG. 1 illustrates an environment within which an embodiment of the method may be used. A message presentation service 10 allows a person or "leader" 12 to manage a message project with one or more other "participants" or "invitees" 14, 16, 18, and 20, who may record messages to be edited into a "playlist of messages." The playlist of messages is included on a playlist device 22, which is presented to a recipient 24, who may play the recorded messages as many times as desired. The message presentation service 10 facilitates the creation of the playlist of messages and their inclusion in playlist device 22. In addition, the message presentation service 10 facilitates the delivery of the playlist device 22 to a recipient 24.

More details regarding the implementation of the message presentation service 10 may be found below in connection with FIG. 2. The term "message project" refers to the creation of a particular playlist of messages by a particular person or "leader" using the message presentation service. A "playlist of messages" is used herein to refer to one or more actual recorded communications or messages from one or more participants that are ultimately delivered to a recipient. A playlist of messages may include any combination of edited messages, unedited messages, parts of messages or all three, provided by some or all of the participants in a message project. A "playlist device" contains the playlist of messages and is able to play or present some or all of the recorded messages as many times as desired.

As illustrated in FIG. 1, the message presentation service 10 may be implemented in communication with a telephone network or a global data communications network 26 such as the Internet. For example, the message presentation service 10 may present information about its services on a website accessible to the public through the Internet. The person 12 who communicates with the message presentation service 10 regarding the creation of the message project is referred to herein as a leader. If the message presentation service provides its services on a subscription basis, the leader 12 also may be referred to as a "subscriber." A leader 12 or other participants may use a computer 28 or other communication device, such as a device connected to a telephone network and the Internet 26 to access the website of the message presentation service 10. Advantageously, the leader 12 also may use a computer 28 to communicate with the message presentation service 10 with respect to most aspects of the message project as described further below.

A personal or laptop computer 28 is depicted and described as the tool of communication used by the leader 12 with respect to the message presentation service 10. Those skilled in the art will understand that a variety of other communication devices may be used instead of or in addition to computer 28. For example, the leader 12 may use a mobile phone 29 for communicating with the message presentation service or other participants on one or more aspects of the message project.

The message presentation service 10 may receive calls directed to a toll-free telephone number from participants in a message project. As a result, the message presentation service 10 may receive messages from the participants for inclusion in the message project. Referring to FIG. 1, the message presentation service may receive a call from the leader 12, who may be a participant in as well as the leader of the message project. The message presentation service also may receive calls from participants such as participant 14, who may use a telephone 30 to call the message presentation service 10. Other participants such as participants 16, 18 and 20 may use a wireless unit 32 or a computer 33 or any other portable personal digital recording device, such as a Griffin iTalk Voice Recorder plugged into an iPod sold by Apple Computer, Inc., a Sony or Olympus Digital Voice Recorder or a personal digital assistant (PDA) like the Palm Pilot that allows users to record "voice memos," to participate in the message project. Participants may also use the Internet, a retail outlet or other means to reach the message presentation service 10.

FIG. 1 and this description refer to only a few participants 14, 16, 18 and 20 (including leader 12), but there may be one or more participants in a message project. The actual number of participants may vary from project to project, and may depend on the desired length of the playlist of messages, the special occasion for the presentation, the relationship of the participants to the recipient, and a myriad of other factors. Further, the participants are illustrated and described as participating in the message project via a computer 28, mobile phone 29, telephone 30, wireless unit 32 or any other portable personal digital recording device, such as a Griffin iTalk Voice Recorder plugged into an iPod, a Sony or Olympus Digital Voice Recorder or a PDA. Nonetheless, a participant may participate in a message project by using any other suitable device.

As noted above, the message presentation service 10 receives calls from participants and may record their messages for inclusion in a message project. A message also may be referred to as a communication or a recording. The message presentation service 10 may carry out some processing with respect to the recorded messages as is explained below in connection with FIG. 7. The message presentation service 10 may edit, or provide for the editing of the messages into a playlist of messages as explained below in connection with FIG. 7.

Further, in one embodiment the message presentation service 10 may present a recipient 24 with information that a playlist of messages is available for the recipient's review. A recipient 24 may access the playlist of messages by calling a toll-free telephone number and listening to the playlist of messages. Alternatively, or in addition, the message presentation service 10 may deliver the playlist of messages to a recipient 24 such as by including the playlist of messages on a playlist device 22 and delivering the playlist device 22 to the recipient 24. Or, the message presentation service may deliver the playlist device 22 to the leader 12 or another participant who may then present or deliver the playlist device 22 to a recipient 24.

Further details regarding a playlist device are provided below in connection with FIG. 2. The message presentation service 10 may provide copies of the playlist of messages to the leader 12, or other participants 14, 16, 18, and 20, as directed by the leader 12 or the other participants. Copies of the playlist of messages may or may not be included on playlist devices. The delivery of the playlist of messages, whether on a playlist device or not, may be referred to as a playlist delivery.

FIG. 1 illustrates a single playlist device 22 and a single recipient 24, but the inventions should not be so limited. The playlist of messages may be distributed between two or more playlist devices, which may all be delivered to a recipient at the same time or may be delivered sequentially over time. Moreover, there may be more than one recipient. For example, a recipient may be a group of family members, a work unit, or other group rather than an individual. As another example, the same playlist of messages may be included on two or more playlist devices that are delivered to respective recipients. For example, a set of twins may each receive a playlist device with the same playlist of messages celebrating the twins' birthday and created as a message project by family members of the twins.

As another example, different playlists of messages from the same message project may be included on two or more playlist devices that are delivered to different recipients. For example, a leader may want to address each twin personally in an introduction to a playlist of messages. The playlist device for one twin may therefore include a different introduction to the playlist of messages than the playlist device for the other twin. As another example, a leader may organize a message project for an uncle, and may later decide to order a playlist device for herself. The playlist device for the uncle may include the entire playlist of messages, and the playlist device for the leader may include only a few of the messages from the entire playlist of messages.

Figure 2:
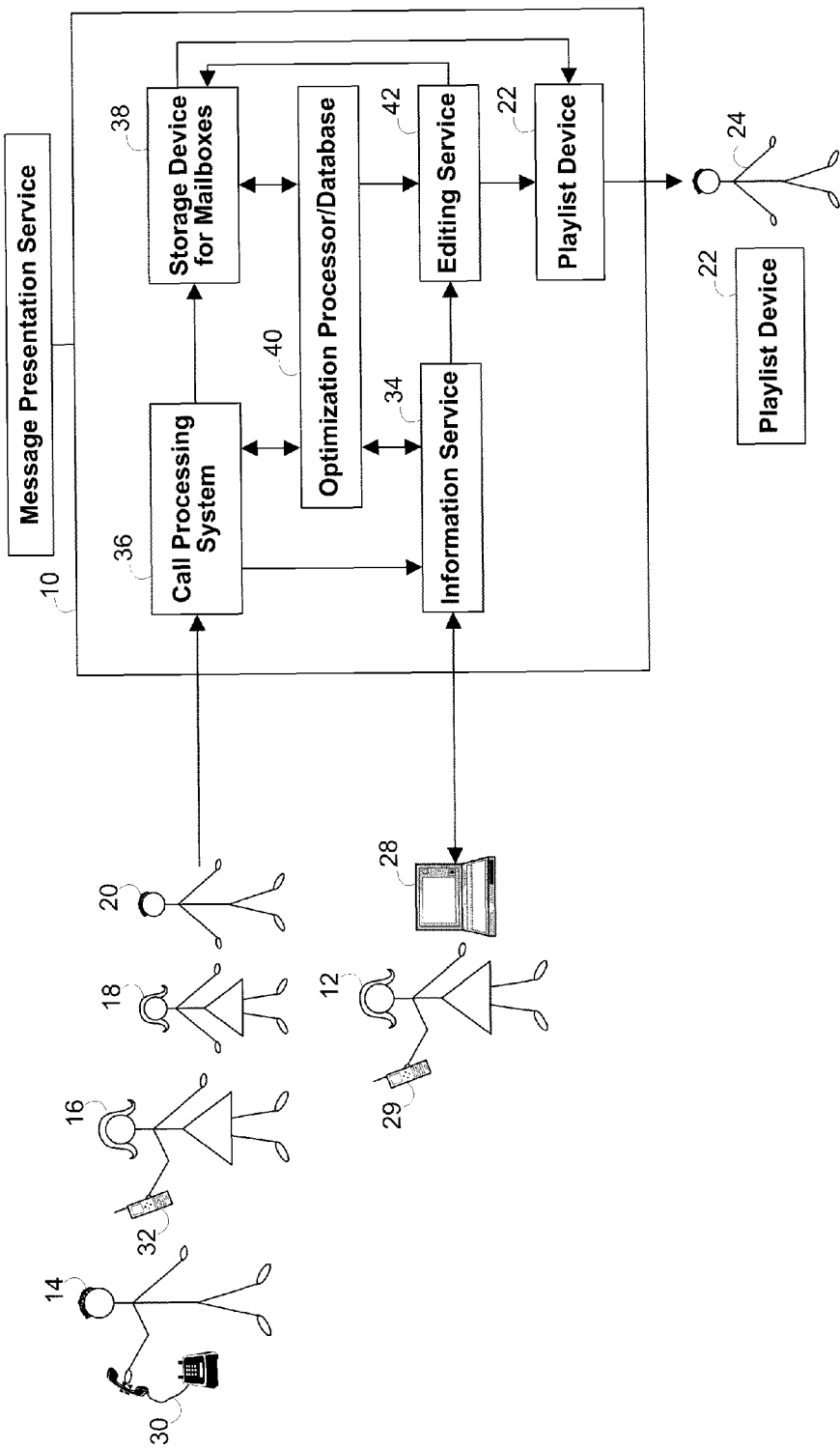
FIG. 2 illustrates elements of a message presentation service according to an embodiment of the disclosed method.

FIG. 2 illustrates elements of a message presentation service 10 in communication with the leader 12 of a message project via a computer 28 or a mobile phone 29. Generally stated, the message presentation service 10 is implemented using computer software and hardware and telecommunications technology. For ease of description, the elements of a message presentation service 10 are illustrated in communicable connection (as described below) within a box so the elements may appear to constitute a single unit, but the inventions should not be so limited. The elements may be distributed between two or more devices or systems. For example, the message presentation service 10 as illustrated includes a call processing system 36. The message presentation service 10 may, however, contract with an independent call processing system for call processing services. The call processing system or services may include voicemail systems and services. The call processing system may be reached by participants in the message project by telephone, by the Internet, through a retail outlet or any other communication means.

The message presentation service 10 generally communicates with the leader 12 via its information service 34, which may be provided on a website, downloaded or transferred (e.g., by e-mail) to a secondary computer system such as a personal computer or network computer for long term storage, or transmitted locally from a computer system associated with a message presentation service or from the Internet to an electronic device of the leader such as a telephone, personal digital assistant (PDA), mobile or handheld computer or any other suitable device that combines some or all the features of those devices (not shown). For example, the information service 34 may provide and interact with a website on the Internet to facilitate communication with the leader 12. The leader 12 may receive a wide variety of information including, but not limited to, promotions, credit offers, special advertising or any other related information.

If desired, the leader 12 may identify himself (i.e., "log in" to the system) by providing some identification to the information service 34 such as an e-mail address and personal identification number (PIN), an electronic serial number (ESN) or some other form of identification (or remain anonymous). As the information service 34 receives information from the leader 12, the information service 34 may provide such information to other elements of the message presentation service 10, such as the leader's profile (name, telephone number or address), a record of past purchases, sales or promotional offers based on the profile, or targeted advertising or solicitations. In addition, the information service 34 may interact with other elements of the message presentation service 10 with respect to the information received from the leader as well as other information.

Still referring to the elements of a message presentation service 10 as illustrated in FIG. 2, the information service 34 may be in communicable connection with a call processing system 36. The call processing system 36 may receive calls from participants 14, 16, 18 and 20 and record their messages for inclusion in the message project. The call processing system 36 may also receive messages from participants 14, 16, 18 and 20 by e-mail or any other means. The call processing system 36 may provide to leader 12 information regarding the recorded messages through information service 34. The call processing system 36 may also be communicatively connected to storage device 38 and an optimization processor/database 40. Storage device 38 may contain a storage medium for storing mailboxes where recorded messages may be stored and accessed. The optimization processor/database 40 may be used by the message presentation service 10 to create digital audio (or audiovisual) files (DAF) of the messages received from the participants.

The digital audio or audiovisual files of the messages then may be optimized. For audio files, this may include, but is not limited to, converting to or from any of the following format types: analog; MIDI; MPEG; PCM; Windows Media Audio Code (WMA); WAV; MP3 or Adaptive Transform Acoustic Coding (ATRAC). For video files, this may include, but is not limited to, converting to or from any of the following format types: analog; JPEG; MPEG; GIF or AVI.

The call processing system 36 may send messages directly to the storage device 38, or may first send the messages to the optimization processor/database 40 and upon their return, then send the messages to the storage device 38. The optimization processor/database 40 may also be connected to the storage device 38 so that the optimization processor/database 40 may forward messages received from the call processing system 36 to the storage device 38 without returning them to the call processing system 36. Alternatively, the referenced communicable connections allow the call processing system 36 to transmit messages to the storage device 38, which then may send the messages to the optimization processor/database 40.

The messages may be stored in the storage device 38 as optimized messages, as DAF messages, or as optimized DAF messages. Advantageously, one embodiment provides for conversion of the messages by optimization processor/database 40 into a format that may be most easily accessed and used by leader 12. Leader 12 may select the message format through communication with information service 34. Optimization processor/database 40 may notify leader 12 through information service 34 that the message (or messages) has been optimized.

In the embodiment shown in FIG. 2, the optimization processor/database 40 may communicate with information service 34 and an editing service 42 that may be communicatively connected to information service 34. The editing service 42 as its name implies may be used to edit messages into a playlist of messages. Such editing may include ordering the messages, deleting messages or parts of messages, such as deleting background noise or pauses, adding commentary or other audio like music or sound effects, increasing the message volume or other types of editing. The editing may be carried out by the leader 12 or a designee through information service 34. Alternatively, the message presentation service 10 may carry out the editing with or without input from the leader 12.

The editing service 42 may be communicatively connected to the playlist device 22, which is illustrated as within the "box" of message presentation service 10, and as delivered to a recipient 24. The playlist device 22 is illustrated in this fashion to show that the message presentation service 10 may be used to include the playlist of messages in the playlist device 22, and in particular that the editing service 42 of the message presentation service 10 may transmit the playlist of messages to the playlist device 22. Alternatively, the editing service 42 of message presentation service 10 may transmit the playlist of messages to be stored in storage device 38 as edited messages. Storage device 38 may then transmit the edited playlist of messages to playlist device 22. As noted above, a copy of the playlist of messages may be provided to the leader, other participants or other persons, and in that case, the playlist of messages may be transmitted from the editing service 42 through the information service 34 to the leader, participants or other persons.

Figure 3:
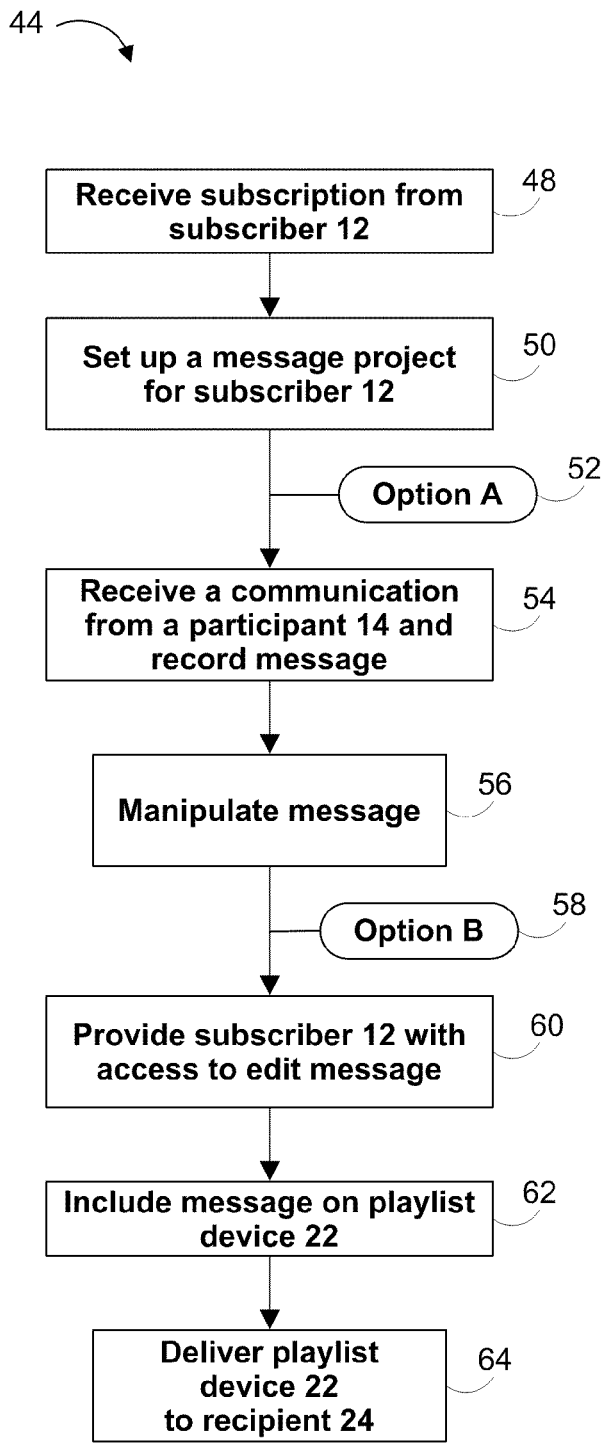
FIG. 3 illustrates actions of an embodiment of the disclosed method.

FIG. 3 is a flow diagram of an overview of actions 44 of an embodiment of the method using the example of a message presentation service. The overview of actions 44 of FIG. 3 is supplemented with optional and alternative actions as illustrated in and described with reference to FIGS. 4 through 8.

Referring to the overview of actions 44 of FIG. 3, the message presentation service 10 may receive a request for participation in a message project. The message presentation service 10 may offer message projects as subscription services. In that case, in action 48 the message presentation service 10 receives a subscription for participation in a message project from a leader or subscriber 12. In action 50, the message presentation service 10 sets up the message project for the subscriber 12.

Figure 4:
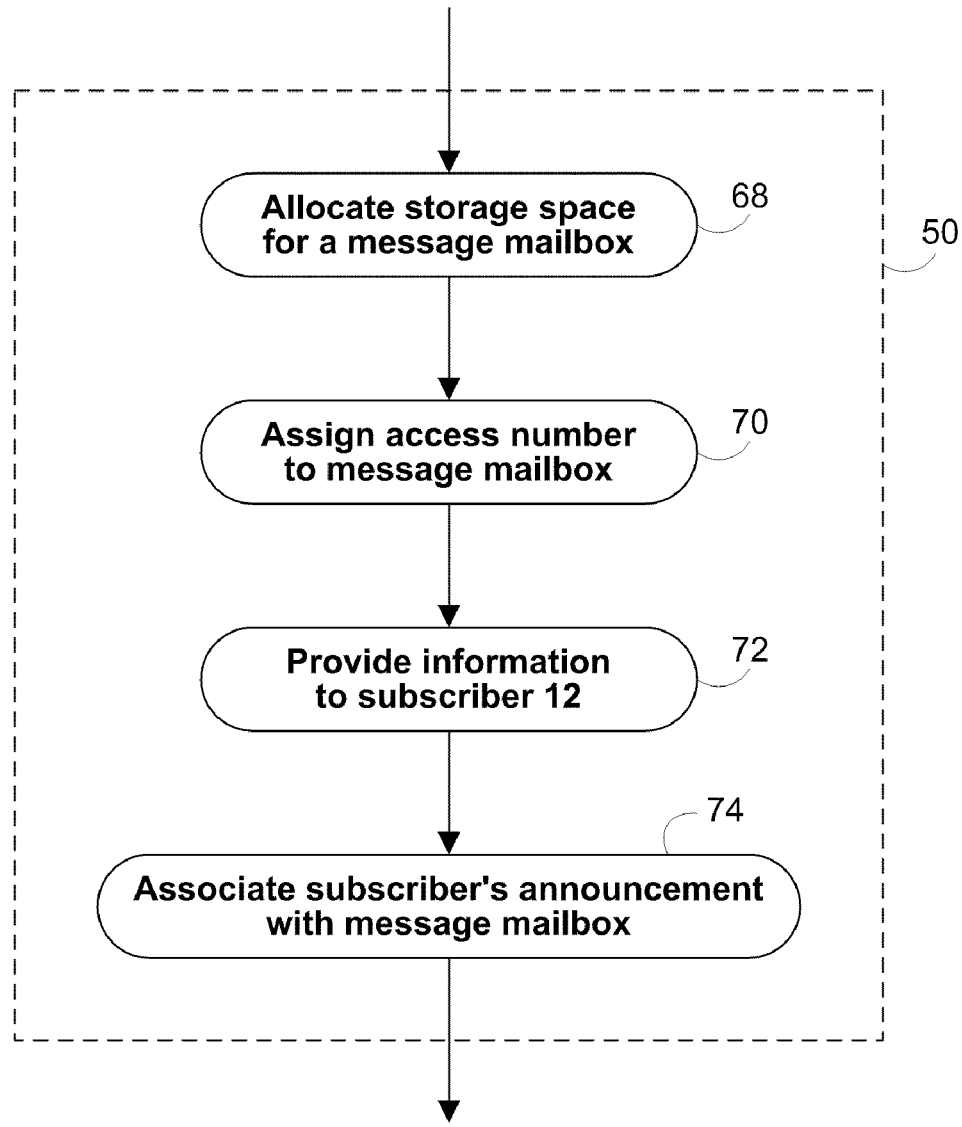
FIG. 4 illustrates actions of an embodiment for setting up a message project for a leader or subscriber.

FIG. 4 provides details that may be carried out by a message presentation service with respect to action 50 of setting up a message project for the subscriber 12. In action 68, the message presentation service allocates data storage space for storing a message mailbox for the message project. In action 70, the message presentation service assigns an access number to the message mailbox. Also, a subscriber 12 may be provided with or asked to specify a personal identification number (PIN) and that PIN may be associated with the subscriber's access number to the message mailbox for the message project. Anytime the subscriber 12 chooses to access the message project, the subscriber may have to provide the PIN to authenticate identity as the subscriber for the message project. There may be a toll-free telephone number that participants may call to access the message project.

In action 72, the message presentation service provides the subscriber 12 with information related to the message project including the assigned access number, PIN and toll-free telephone number. The provided information also may include tips, tools, and resources for various aspects of the message project such as starter information to help get the project off the ground. For example, templates, scripts, thought starters, and suggestions may be provided for use or as guidance in the solicitation of messages, creation and distribution of invitations for participation, persuasion of reluctant invitees, follow-up on solicitations, and questions about content, length, or style of messages. The provided information also may contain a template for use by the subscriber in recording an introduction, greeting, or announcement to be played to invitees when they call to participate in the message project. The subscriber's recording may include a deadline for the submission of messages for the message project.

As the final action illustrated in FIG. 4, in action 74 the message presentation service 10 associates an announcement with the message mailbox of the message project to be played to invitees when they call the toll-free telephone number and enter an invitation identification number (discussed in more detail below). The announcement may function as a greeting, and may provide information and instructions related to the message project. The announcement may be a recording of a greeting, introduction, and instructions provided by the subscriber.

Referring again to the overview of actions shown in FIG. 3, after the message project is set up in action 50, the subscriber 12 may distribute invitations to other invitees. The subscriber may make such invitations in person, on the telephone, by mail, using e-mail or other means of communication. The subscriber may take advantage of services provided by the message presentation service in distributing the invitations.

An embodiment of the inventions may allow a subscriber 12 to categorize invitees into two or more categories. Each category may be allotted a predetermined message length different from the message lengths for the other categories. For example, for a particular message project a subscriber may categorize invitees into family, friends, and neighbors. Invitees in the family category may be allotted a longer time for recording a message than invitees in the friends category, who, in turn, may be allotted a longer time for recording a message than invitees in the neighbor category. An invitee may or may not be provided with information with respect to his or her categorization as part of the message project.

Figure 5:
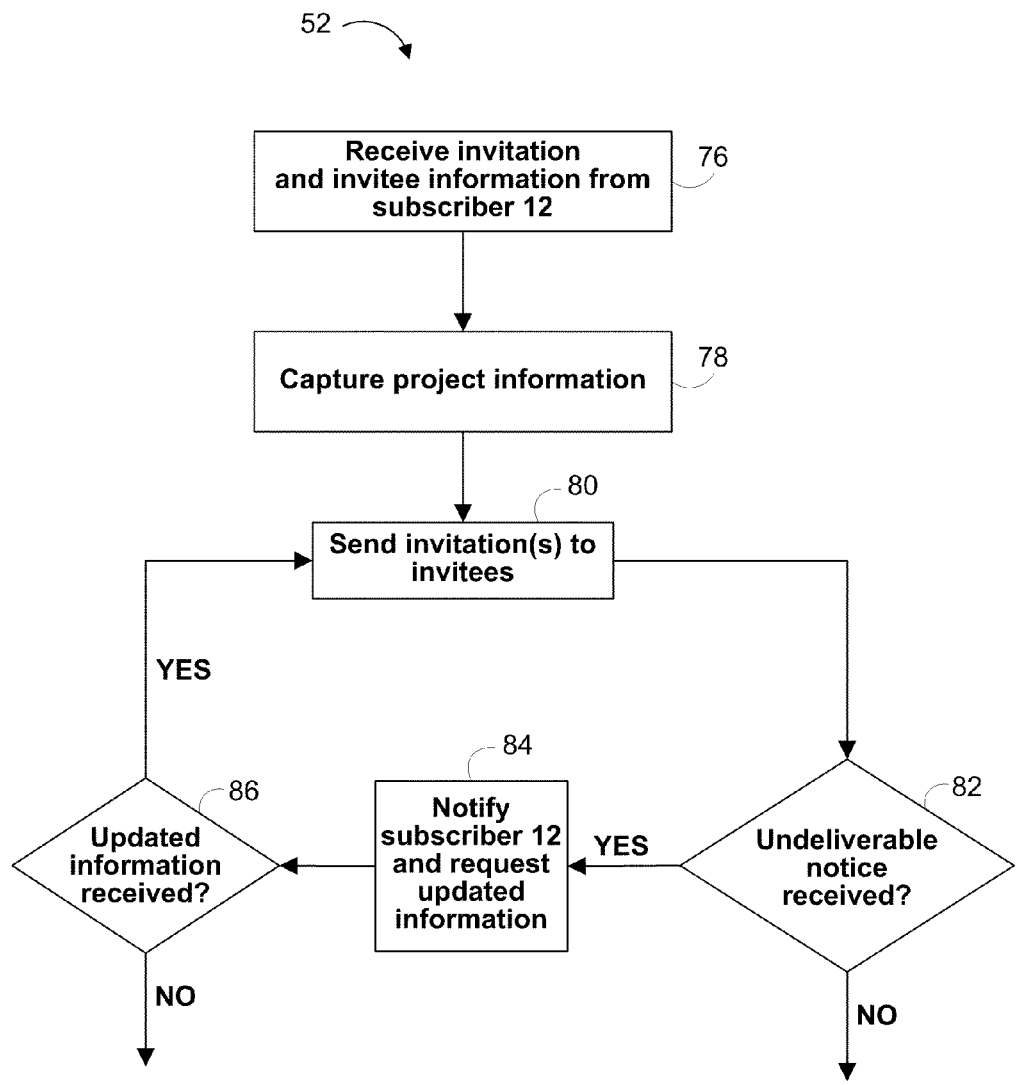
FIG. 5 illustrates actions of an embodiment for an option after setting up a message project for a leader or subscriber.

FIG. 3 illustrates that option A 52 may follow the set up of the message project in action 50. The actions of option A 52 are illustrated in FIG. 5 and they include actions that may be executed by the message presentation service in assisting the subscriber with invitations. In action 76, the message presentation service may receive invitation information and invitee information from subscriber 12.

Invitation information refers to the particulars of the message project. A subscriber 12 may provide the message presentation service with identifying information relating to the invitation. This identifying information may include designations of total time for a message project, total number of invitees or recipients, the occasion for the message project, the date of the occasion and other information. Invitee information refers to the particulars of the invitees. A subscriber 12 may provide the message presentation service with identifying information relating to the invitees. This identifying information may include designations of particular invitees' categories, e-mail addresses, phone numbers, time and duration of phone calls, number of times they call and any other information, such as formal names.

In action 78, the message presentation service may collect and save to a database project information provided as or as part of the invitation information provided by the subscriber. For example, the message presentation service may collect and save to a database the deadline for submission of messages, the length of the playlist of messages, the occasion for the message project, the date of the occasion, or other project information. This information may be used in the future for advertisements or other merchandising.

In action 80 of FIG. 5, the message presentation service may use the invitee information provided by the subscriber to send invitations to invitees. Each invitation may include the toll-free telephone number that invitees call, as well as a unique invitation identification number that invitees may enter to identify themselves when they contact the message presentation service. In one embodiment, the message presentation service may send e-mail invitations to the invitees using their e-mail addresses. The message presentation service, however, may be configured to send invitations according to other methods, such as using regular, priority or overnight mail services and the like, telephone, text messaging, instant messaging or other methods.

The message presentation service may monitor for the delivery and receipt of the invitations by noting whether any notice of an undeliverable invitation has been received in action 82. If no undeliverable notice has been received, then the message presentation service may assume that the invitations have been delivered. If the message presentation service receives an undeliverable notice with respect to one or more of the invitees, the message presentation service, as illustrated in action 84, may notify the subscriber 12 and request that the subscriber 12 provide updated delivery information. If the message presentation service receives the updated delivery information as checked in action 86, then the message presentation service may repeat the actions 80 and 82 of sending the invitation, monitoring delivery and receipt and so forth. If the check of action 86 does not result in updated delivery information, then other actions may be taken such as notifying the subscriber of the problem.

Referring again to FIG. 3, after the subscriber invites the participants to participate in the message project, they may call or otherwise contact the message presentation service to record their communications or messages for inclusion in the message project. In action 54, the message presentation service may receive a communication directed to an invitation identification number associated with a particular message project. The message presentation service may learn the participant's telephone number and workplace if the participant calls from his office, whether the participant blocks caller identification devices, the time of day that the participant calls, how long the participant's message is and any other information that the message presentation service may receive from the communication. The result of the communication may be a message from the participant for inclusion in the message project.

Figure 6:
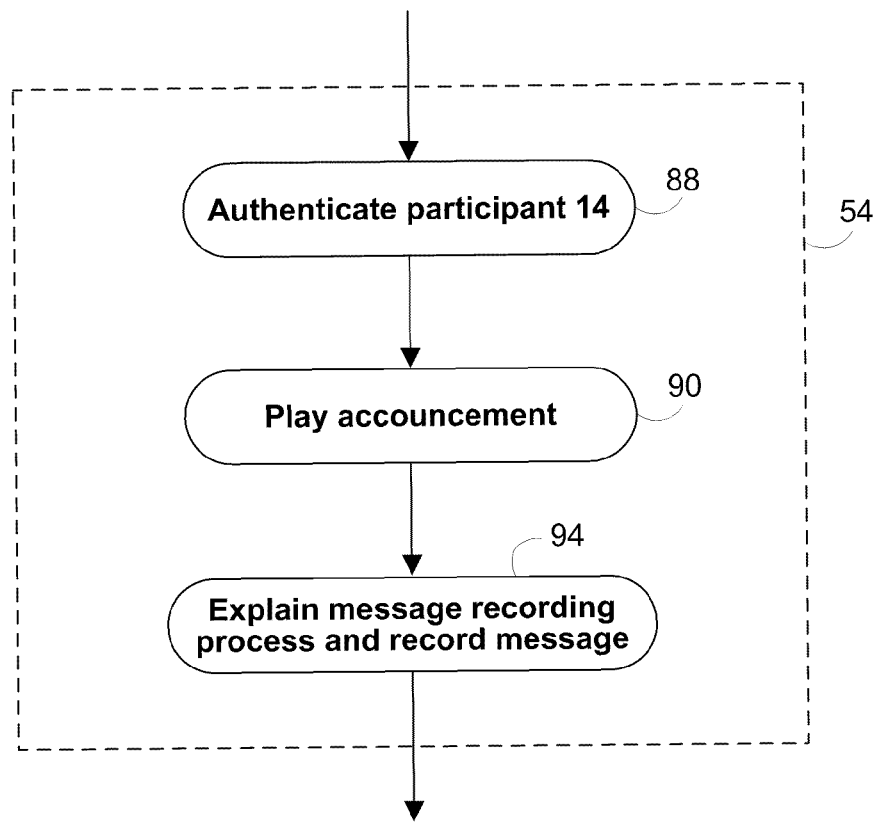
FIG. 6 illustrates actions of an embodiment for receiving a communication with a message.

FIG. 6 illustrates actions that may be taken by the message presentation service as part of action 54 in the receipt of a communication from a participant and recording of a message from that communication. Upon receipt of the communication, the message presentation service in action 88 may authenticate the participant 14 as an authorized participant in the message project. Authentication may be carried out by checking the invitation identification number used by the participant, by asking the participant for an authentication or personal identification number (PIN) for the message project, by asking the participant for a form of identification such as a driver's license, passport or any other form of identification if the participant seeks to record a message at a retail outlet, or by other means of authentication, such as by checking the participant's e-mail address or phone number.

The authentication process also may involve a determination of the category of a participant, if the subscriber has opted to categorize participants. Several attempts at authentication may be provided. If the participant is not authenticated, then the message presentation service may terminate the call or communication.

In action 90 of FIG. 6, if the participant 14 is authenticated as an authorized participant, then in action 90 an announcement for the message project may be played to the participant 14. The announcement may include a greeting by the subscriber. The announcement may be made by the subscriber or by the message presentation service.

In action 94, specific instructions may explain the process for recording the participant's message, and the participant's message may be recorded. The explanation of the recording process may be made by the subscriber 12 or by the message presentation service, and the explanation may inform the participant 14 of the length of time allotted for his or her message. After the message is recorded, the recorded message may be associated with the message project by the message presentation service.

One embodiment of the inventions provides for actions in predefined situations relating to a message project. For example, assume a participant calls the message presentation service for a second time to leave an additional message for a message project, or the participant desires to replace the initial message with another message. The message presentation service may note that a message has already been received from the participant. The message presentation service also may check and determine that the previous message has not been deleted by the participant or by the subscriber 12. The message presentation service may decline to accept another message from the participant. Alternatively, the message presentation service may inquire whether the participant wants to delete the first message and replace it with a new message and allow the participant to do so. Alternatively, the message presentation service may contact the subscriber and request instructions, or may allow for the recording of a multiple message by a participant.

As another example, assume an invitee calls the message presentation service after the deadline for a message project. The message presentation service may decline to accept a message from the invitee based on the expiration of the deadline or may contact the subscriber 12 and request instructions. Further, assume a subscriber has subscribed to a message project for a specific length of recording time for the playlist of messages, and that specific length of time has been reached. Also assume an invitee calls the message presentation service after the specific length has been reached. The message presentation service may decline to accept a message from the invitee based on the specific length having already been reached or may contact the subscriber and request instructions.

As yet another example, assume a message project has been disabled for whatever reason. Also assume an invitee calls the message presentation service for that message project. The message presentation service may decline to accept a message from the invitee based on the disablement of the project or may contact the subscriber and request instructions.

Figure 7:
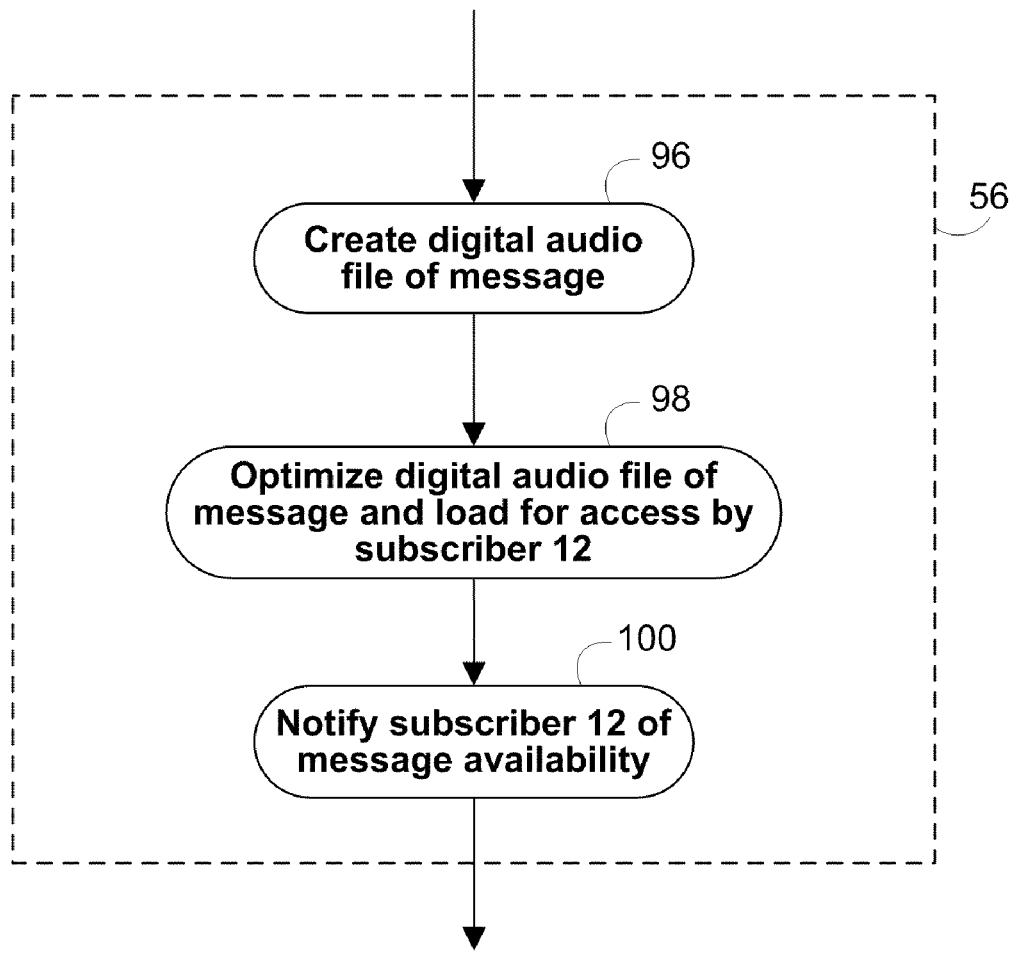
FIG. 7 illustrates actions of an embodiment for manipulating a message.

Referring again to FIG. 3, after a participant's message is recorded in action 54, then the message may be manipulated as specified in action 56. FIG. 7 provides detailed actions relating to such possible manipulation. In particular, manipulating the message may include, as specified in action 96, creating a digital audio file (DAF) of the message. Further, as noted in action 98, the DAF message may be optimized. As also noted in action 98, the DAF message (after optimization) may be loaded for access by the subscriber 12. For example, the message may be made available to the subscriber on the website of the message presentation service, by the subscriber calling a toll-free telephone number or by other means. The message may be made available in a format chosen by the subscriber. In action 100, the subscriber 12 may be notified of the receipt of the message and of its availability. The notification may include information about the message. In one embodiment, the notification to the subscriber by e-mail may include a hyperlink to allow access to the message.

The actions 54 and 56 shown in FIG. 3 of receiving a communication, recording a message and manipulating it may be repetitively carried out for all communications or messages received for the message project.

In FIG. 3, option B 58 is shown as following the action of manipulating a message 56, but the actions of option B 58 may be carried out at other times as appropriate. The actions of option B 58 are described in detail with reference to FIG. 8. An embodiment of the inventions takes notice when one or more milestones in a message project have been achieved as noted in action 102.

A milestone in a message project may be any of a number of things such as receipt of a first message, receipt of half the invited messages, or receipt of all of the invited messages. Other milestones may relate to the length in time of recorded messages such as 10 minutes of recorded messages. Yet other milestones may refer to the number or percentage of expected invitees who have left messages. Other milestones may relate to the number of days left with respect to a deadline provided by the subscriber for receipt of messages for the message project. A subscriber may select one or more milestones of varying types. Alternatively, a message presentation service may offer a set of milestones as a default for a message project. The creation or selection of milestones may be carried out during the set up of the message project (see action 50 of FIG. 3).

Figure 8:
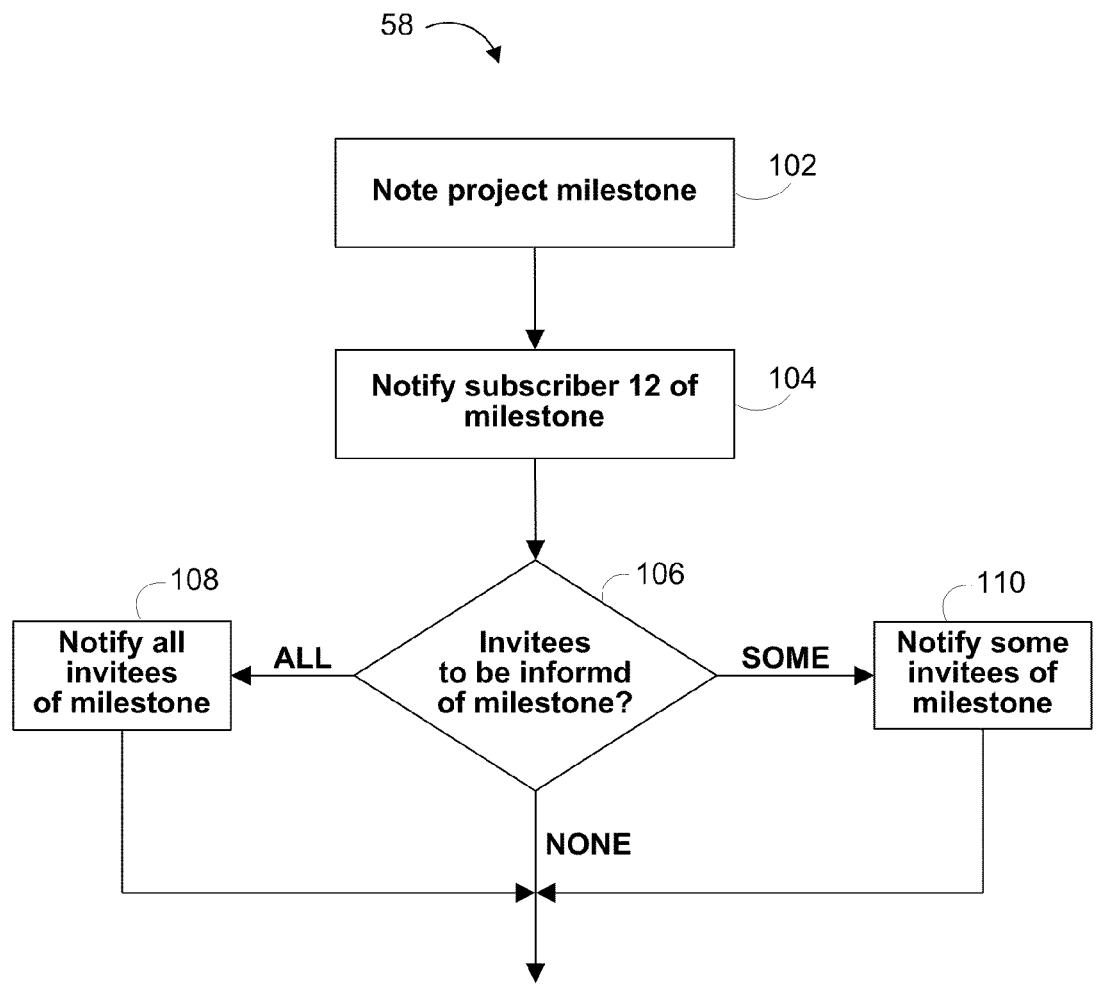
FIG. 8 illustrates actions of an embodiment for an option of noting when a milestone in a message project has been achieved.

Action 104 of FIG. 8 shows that a subscriber 12 may be notified by the message presentation service upon the achievement of one or more milestones. The subscriber 12 may be notified by e-mail, but other methods of notification may be accommodated, such as by telephone. In action 106, the message presentation service checks whether invitees (or other individuals) are to be notified of the achievement of a message project milestone. The message presentation service may allow a subscriber to designate one or more milestones that invitees (or other individuals) may be notified of.

Further, the message presentation service may allow a subscriber 12 to designate which invitees are to be provided with the milestone notification. If all invitees are to be notified, then in action 108 the message presentation service provides such notification. If only some invitees are to be notified, then in action 110 the message presentation service only notifies the designated invitees. As also indicated by action 106 of FIG. 8, the subscriber may designate that no invitees are to be notified of achievement of a milestone. For example, at a particular milestone, the message presentation service may check which invitees have submitted a message, and may send a reminder message to invitees who have failed to leave a message.

FIG. 9 is an example of a table 112 such as may be provided by a message presentation service to a subscriber 12 or to designated invitees. As noted above in connection with the recording of a message for a message project (see action 54 of FIG. 3) and with the achievement of a milestone in a message project (see action 104 of FIG. 8), a message presentation service may provide a subscriber with information about the status of the message project. Table 112 is an example of how information relating to seven sample messages for a particular message project may be conveyed to the subscriber.

As shown in FIG. 9, example table 112 includes rows for each message entry and columns for the details of each message. In particular, example table 112 includes several columns for details regarding information about the seven message entries that appear in the table. The columns in table 112 are labeled: Date; Telephone Number of Recording; Category; Voicemail Message; Label of Invitee; Length of Message and Playlist Order.

Advantageously, the message presentation service may allow the subscriber to choose or specify what information to include in a table like table 112. In other words, a table may be customized for a particular subscriber or a particular message project. The message presentation service may provide all or some of the details for the table by populating the details with information from the message presentation service's data relating to the message project.

In addition, the subscriber may provide supplemental information, input or edit the table to further suit the subscriber's needs. The message presentation service may facilitate the input or selection of information by the subscriber such as by providing drop-down menus with selections for input into the table. For example, as noted, table 112 includes a "Category" column. The message presentation service may facilitate the subscriber's input of information into the Category column by providing a button 114 leading to a drop-down menu 117 of category types so the subscriber may choose one type to be included as the detail in the category column for a particular message.

The subscriber may be provided with information about his or her message project in one or more tables. For example, information regarding all messages that have been edited may be included in the table or in a table separate from the table including information about non-edited messages.

The message presentation service may provide one or more table(s) to the subscriber via e-mail or via the message presentation service's website.

A table such as table 112 may have other functions in addition to providing information about messages. As illustrated in FIG. 9, the table 112 may include a "play" "button" or detail 116 with respect to each message in the table. The subscriber may activate the "play" detail to listen to its corresponding message. In other words, the "play" detail may be a link to one of the messages recorded for the message project. The "play" detail may also be required to be activated before its corresponding message may be added to a playlist of messages or assigned a number in the Playlist Order column. This may ensure that the subscriber reviews the message before it may be added to a playlist of messages. This may also be a second line of defense if authentication of the participant who left the message is faulty.

Another embodiment may provide a line of defense against faulty authentication of a participant by blocking multiple calls within a given time period from one telephone number. This may safeguard against computers with autodial modems.

A table such as table 112 may include or be used for other functions. A table may be used for a follow-up or reminder function. For this reminder function, the table provided to the subscriber may include information relating to all invitees. The table may supply information on whether or not an invitee has left a message for the message project.

If an invitee has failed to leave a message, the subscriber may use the table to contact the invitee via e-mail, regular mail, telephone or other means to remind the invitee of the project. For example, the entry corresponding to the invitee who has failed to leave a message may include his or her name ("label for invitee"). The subscriber may be able to activate the name or label for the invitee, and send an e-mail or other reminder to the invitee.

Another function of the table may be as an aid to keeping track of the subscriber's own work on the message project. The table may include a column for marking entries as either "edited" or "not edited". The indication of which entries have been edited and which have not been edited provides the subscriber with easily viewed information on the status of his or her editing efforts.

Yet another function of the table may be to allow the subscriber to edit the messages of the message project into a playlist of messages. One way of editing the messages is to arrange them in a particular order. Table 112 in FIG. 9 may be configured to allow a subscriber to specify the order of messages in the playlist of messages. Table 112 includes a column called "Playlist Order". A subscriber may specify the place in order of a particular message by including an appropriate number (1, 2, 3, etc.) in the column detail relating to playlist order for that message. Another way of editing the messages is to indicate which messages are to be included in the playlist of messages. A table may be configured to include a column for marking that particular messages are to be included in the playlist of messages. A message missing a necessary entry for inclusion in the playlist of messages would not be included in the playlist of messages. Messages from more than one message project may also be included in one playlist of messages.

In addition, a table may function as a table of contents for a playlist of messages. For example, the subscriber may specify that a table be created with information regarding the edited messages that are included in the playlist of messages. The table may function as a table of contents by providing information about the order of playing the edited messages, the names of the people associated with the messages, the length of each message and other information about the messages.

A playlist of messages of a message project may include all or some of the messages as received, recorded and edited for the project. Advantageously, a message presentation service allows a subscriber 12 to edit the messages described with respect to action 60 of FIG. 3. A first type of editing that the subscriber may carry out is the ordering of the messages in the playlist of messages. A message presentation service orders the messages in a playlist of messages according to the order specified by the subscriber. The subscriber may provide the desired order of messages to the message presentation service in a number of different ways. One way of providing such order information is described above with reference to table 112 of FIG. 9.

Another type of editing that the subscriber may carry out is to specify which messages are to be included or which messages are not to be included in the playlist of messages. The subscriber may provide this information to the message presentation service in a number of different ways. One way of providing such information is described above with reference to table 112 of FIG. 9.

Advantageously, an embodiment of the inventions allows a subscriber 12 to create two or more playlists of messages from the messages recorded for the message project. The subscriber may specify that a first group of the messages is to be included in a first playlist of messages, and a second group of the messages is to be included in a second playlist of messages.

Yet another type of editing that the subscriber may carry out is to provide the subscriber's own message or messages that may be included separately as an introduction, commentary on one or more of the other messages, or as a conclusion. For example, the subscriber may call the message presentation service and record a first message, a second message, and a third message. When the subscriber is editing the messages into a playlist of messages, the subscriber may specify that the subscriber's first message be the first message in the playlist of messages. In this way, the first message of the subscriber may function as an introduction to the other messages. The second message of the subscriber may be included in the playlist of messages just prior to a message recorded by a participant in a situation where the participant's message may need some commentary by the subscriber. The third message of the subscriber may be included as the last message of the playlist of messages, and in this manner, the subscriber's third message may function as a conclusion to the playlist of messages.

In addition to the ordering of messages and deletion of messages, an embodiment of the inventions may provide for editing features such as deleting particular parts of a message rather than a whole message or adding something to an already recorded message prior to the inclusion of such messages in the playlist of messages, such as adding background sounds or music. For example, a subscriber may edit a message for audibility, clarity, or brevity. As another example, a subscriber may mix parts of two or more messages together within the playlist of messages.

In action 62 of FIG. 3, the message presentation service includes the playlist of messages on a playlist device 22. Generally, a playlist device may be a keepsake type of playback device or another playback device that will include the playlist of messages. Such devices may include a tape player, a compact disc player, a DVD player, a mobile audio player, a personal digital assistant, a video player or the like, that may allow a recipient to play and re-play the playlist of messages or portions thereof as desired. Inclusion of the playlist of messages on a playlist device may be carried out by a production process including a production database of the message presentation service. Once the subscriber has finalized decisions about the playlist of messages and communicated such finality to the message presentation service, the message presentation service will take action to include the playlist of messages on a playlist device. Prior to doing so, the message presentation service may solicit information from the subscriber about the type of playlist device to be used.

A playlist device may include features other than the playlist of messages and such features may be customized by the subscriber or the participants for a recipient. For example, the playlist device may include one or more photographs of the subscriber or participants, other persons or other subjects. As another example, the playlist device may include a table of contents in written form for the playlist of messages. Such a table of contents may include the names of the participants in the order they appear in the playlist of messages. The playlist device may include or be provided with a written transcript or translation of the playlist of messages.

As yet another example, the playlist device may be configured appropriately to the occasion for presentation to a recipient. For example, for a birthday, the playlist device may be configured as a birthday cake or otherwise decorated appropriately for a birthday. For a wedding anniversary, the playlist device may be decorated or configured appropriately to the particular anniversary. For example, a playlist device presented on the occasion of a 25$^{th}$ or silver wedding anniversary may be silver in color. The playlist device may also be in the form of jewelry, such as a locket, that may be decorated or configured appropriately, such as for an individual who may be leaving for a military commitment.

An alternative to including the playlist of messages on a playlist device is to include the playlist of messages on a medium that may be readily accessed by or transferred to a recipient, the subscriber, or other individuals. The message presentation service may provide the subscriber with a selection of mediums for recording the playlist of messages. For example, the playlist of messages may be stored on a server of the message presentation service and be accessible over the Internet through the website of the message presentation service, by telephone or otherwise. A playlist of messages may be included or recorded onto a tape, compact disc, DVD, flash drive, video cassette or other medium. In addition, or alternately, the playlist of messages may be transcribed or even translated if necessary, and provided in a format that may be read by or to a recipient or other individuals. Transcription may be particularly useful in cases where one or more messages is difficult to understand by simply listening to it, or if messages are in a language unfamiliar to the recipient or other individuals.

Action 64 of FIG. 3 delivers the playlist device 22 to a recipient 24 (or other individuals) according to the instructions of the subscriber. The message presentation service may offer a subscriber several different options of delivering a playlist device to a recipient. For example, a playlist device may be delivered via a courier service, overnight delivery service, parcel delivery service or by the United States Postal Service. A playlist device may be delivered to the subscriber or his or her designee for further delivery (such as personal delivery) to a recipient. The same or similar delivery options may be made available to the subscriber with respect to a playlist of messages that is included in another medium such as a tape, compact disc, or other devices mentioned above. If the playlist of messages is to be made available via the website of the message presentation service, the subscriber may have options with respect to the delivery of the information necessary to access the playlist of messages by a recipient. The message presentation service may provide the subscriber with information such as confirmation about the delivery of the playlist device.

The message presentation service may offer the subscriber the option of having his or her own copy of the playlist of messages on a playlist device, or on another medium or accessible via the service's website. Further, the subscriber may specify whether another person such as a participant is to receive a copy of the playlist of messages (on a playlist device, on another medium or accessible via the service's website), and how such person is to receive the playlist of messages. The multiple playlist devices may therefore have identical playlists of messages, or different playlists of messages from the same message project. The message presentation service may carry out the subscriber's instructions with respect to these options. The message presentation service may provide the subscriber with information such as confirmation of the delivery or deliveries of playlist devices, if undertaken by the message presentation service.

Although the embodiments of the inventions detailed throughout the present application are articulated generally for oral audio messages, nevertheless other embodiments of the inventions may also include video and video playback devices, photographs and photo display devices or any other form of audiovisual devices, such as digital photographs and digital photograph display devices.

From the foregoing description of actions and embodiments of the inventions and operation thereof, other embodiments will suggest themselves to those skilled in the art.

What is claimed is:

1. A method for assisting a leader of a message project to provide one or more messages to a recipient, comprising:
   receiving at a remote computer a subscription for the message project from the leader;
   assigning a mailbox with an access number to the message project wherein the assignment is performed by the remote computer, and wherein the mailbox is configured to receive a plurality of messages;
   providing the access number to the leader;
   receiving at the remote computer a communication directed to the access number as a communication for the message project, wherein the communication comprises at least one of an audio message, a digital photograph, and a digital movie, and wherein the remote computer is configured to receive a plurality of communications;
   storing a message received as part of the communication directed to the access number in the mailbox assigned to the message project;
   including the stored message on a device that allows for playback of the message; and
   delivering the device that allows for playback of the message to a recipient or other person as designated by the leader.

2. The method of claim 1, wherein multiple communications directed to the mailbox are received from the leader or other participants in the message project;
   wherein multiple messages from the multiple communications are stored in the mailbox assigned to the message project;
   wherein the stored messages are included on the device that allows for playback of the messages; and
   wherein the device that allows for playback of the messages is delivered to a recipient or other person as designated by the leader.

3. The method of claim 2, further comprising:
   providing the leader with an opportunity to record a greeting to be played to other participants in the message project when each participant provides a communication directed to the mailbox assigned to the message project; and
   playing the recorded greeting to such participants.

4. The method of claim 1, further comprising:
   after storing the message, converting the message to a format for access by the leader.

5. The method of claim 2, further comprising:
   receiving at a remote computer an instruction from the leader to send an invitation to participate in the message project to other participants in the message project;
   obtaining identification information for the other participants from the leader wherein the obtaining of information is performed by the remote computer;
   using the identification information to send invitations to participate to the other participants;
   electronically receiving message project information from the invitations to participate wherein the receiving of information is performed by the remote computer; and
   associating the message project information with the message project.

6. The method of claim 2, further comprising:
   providing the leader with notice of a message received as part of the message project.

7. The method of claim 6, wherein providing the leader with the notice of a message received comprises providing the leader with information to enable the leader to listen to the message.

8. A method for providing a keepsake device containing a playlist of messages, comprising:
   providing a telephone number to a leader for a message project for distribution to other participants in the message project wherein the providing of the telephone number is performed by a remote computer;

receiving telephone calls directed to the telephone number from other participants;

storing messages received as part of the telephone calls from the other participants;

allowing the leader to edit the messages received into a playlist of messages; and including the playlist of messages in a keepsake device that allows for playback of all or portions of the playlist of messages, wherein including the playlist of messages in the keepsake device comprises allowing the leader to include in the keepsake device at least one of an audio message, a digital photograph, and a digital movie.

9. The method of claim 8, further comprising providing information about message content to the leader for distribution to other participants in the message project.

10. The method of claim 8, wherein storing messages received as part of the telephone calls from the other participants comprises:

storing messages from designated participants in a first category of messages of predetermined lengths; and storing messages from other designated participants in a second category of messages of predetermined lengths.

11. The method of claim 8, wherein allowing the leader to edit the messages into the playlist of messages comprises allowing the leader subscriber to edit some or all of the messages into a first playlist of messages, and to edit some or all of the messages into a second playlist of messages; and wherein including the playlist of messages in the keepsake device comprises including the first playlist of messages in a first keepsake device and including the second playlist of messages in a second keepsake device.

* * * * *